(12) United States Patent
Gurusami et al.

(10) Patent No.: US 7,856,037 B2
(45) Date of Patent: Dec. 21, 2010

(54) SYSTEM OF METHOD FOR DYNAMIC RANGE EXTENSION

(75) Inventors: Aravanan Gurusami, New York, NY (US); Douglas Llewellyn Butler, Painted Post, NY (US); Timothy K. Zahnley, Spencer, NY (US); Scott R. Dahl, Corning, NY (US); Peter G. Wigley, Corning, NY (US)

(73) Assignee: Oclaro (North America), Inc., San Jose, CA (US)

( * ) Notice: Subject to any disclaimer, the term of this patent is extended or adjusted under 35 U.S.C. 154(b) by 624 days.

(21) Appl. No.: 11/687,444

(22) Filed: Mar. 16, 2007

(65) Prior Publication Data

US 2008/0225914 A1 Sep. 18, 2008

(51) Int. Cl.
*H01S 3/13* (2006.01)
*H01S 3/00* (2006.01)
(52) U.S. Cl. .................. 372/29.02; 372/33; 372/38.07
(58) Field of Classification Search ............. 372/29.02, 372/33, 38.07, 38.08, 25, 30
See application file for complete search history.

(56) References Cited

U.S. PATENT DOCUMENTS

| 5,563,732 | A | | 10/1996 | Erdogan et al. |
| 5,594,748 | A | * | 1/1997 | Jabr .................. 372/38.09 |
| 6,058,128 | A | * | 5/2000 | Ventrudo .................. 372/96 |
| 6,215,809 | B1 | | 4/2001 | Ziari et al. |
| 6,366,595 | B1 | | 4/2002 | Bowler |
| 6,760,152 | B2 | | 7/2004 | Ratoff et al. |
| 6,836,355 | B2 | | 12/2004 | Lelic et al. |
| 7,076,130 | B2 | | 7/2006 | Cai et al. |
| 7,110,167 | B2 | | 9/2006 | Gurusami et al. |

FOREIGN PATENT DOCUMENTS

EP 1 113 540 7/2001

OTHER PUBLICATIONS

S.-Y. Huang; "Phase modulation to stabilize pump lasers with fiber grating feedback," Conference on Lasers and Electro-Optics, pp. 298-299 (2000).

(Continued)

*Primary Examiner*—Armando Rodriguez
(74) *Attorney, Agent, or Firm*—Patterson & Sheridan, L.L.P.

(57) ABSTRACT

The present invention generally relates to the operation of optical network equipment such as optical amplifiers. In one aspect, a method of operating an optical amplifier is provided such that output of the optical amplifier avoids the effects of operating an optical gain medium in a non-linear (kink) region of an L-I curve. The method generally includes operating an optical gain medium in a fully off state or fully on state above the kink region with a PWM signal. In another aspect, the effects of the kink region may be compensated for by utilizing a lookup table. A sample of the optical power of an amplified optical signal may be used to select an entry in the lookup table that compensates for non-linearities in the kink region. In yet a further aspect, a lookup table may be used to control a pulse modulator to compensate for non-linearites in the kink region of the L-I curve.

13 Claims, 8 Drawing Sheets

OTHER PUBLICATIONS

D. Lenstra, et al.; "Coherence collapse in single-mode semiconductor lasers due to optical feedback," IEEE Journal of Quantum Electronics, vol. QE-21, No. 6 (Jun. 1985).

S. Mohrdiek, et al.; "Coolerless operation of 980 nm pump modules," Technical Digest, Optical Fiber Communications Conference, vol. 3, pp. WDD77-1-WDD77-3, Atlanta, GA (2003).

R. McGowan, et al.; "Dual Bragg grating frequency stabilization of a 980 nm diode laser," Technical Digest, Optical Fiber Communications Conference, pp. 671-672, Anaheim, CA (2002).

R. W. Tkach, et al.; "Regimes of feedback effects in 1.5-$\mu$m distributed feedback lasers," Journal of Lightwave Technology, vol. LT-4, No. 11, pp. 1655-1661 (1986).

* cited by examiner

SYSTEM OF METHOD FOR DYNAMIC RANGE EXTENSION

BACKGROUND OF THE INVENTION

1. Field of the Invention

The present invention relates to fiber-optic communications networks, and more particularly, to optical network equipment such as optical amplifiers in which pump powers are controlled to permit pumping under a wide dynamic power range and having stable operation at low pump powers.

2. Description of the Related Art

Optical amplifiers, such as the well-known Erbium Doped amplifier, are pumped by a laser source, typically a laser diode, to derive signal gain. Conventional optical amplifier systems implement power control of the amplifier by changing the DC drive current applied to the pump laser diode so as to control the pump power supplied to a gain medium. This method is used to ensure that the optical amplifier operates at a certain power set point. Unfortunately, when the set point is such that the pump laser is operated near its lasing threshold, reflections in the optical path (from anywhere between the pump and the gain medium) can cause drastic fluctuations in the pump operation. When the pump laser is operated close to its threshold, such reflections and other perturbing effects may cause the pump laser to either drop below threshold or to change its output mode. Such fluctuations cause undesirable wide excursions in the pump output power that limit the stability in both the pump and the amplifier under low power operation. Additionally, pump bistability may occur at currents significantly above threshold, once again limiting the stability and operation of the amplifier/pump.

Conventional solutions to stabilize the output power of the amplifier pump lasers include the use of Fiber Bragg Gratings (FBGs) to stabilize pump wavelength and/or power and pump current dither circuits to stabilize pump power. Pump stabilization designs using FBGs alone impose tight pump laser manufacturing specifications on parameters such as front facet reflectivity and pump laser wavelength control in order to control the detuning between the FBG wavelength and the laser wavelength. The FBG designs for good power stability also typically require long fiber lengths and one or more FBGs in the fiber pigtail at one or more meters from the pump chip, both leading to higher cost.

Although the use of FBGs provides a stable wavelength of operation for the pump at high output powers, it, unfortunately, does not ensure pump power stability at very low power. As the drive current to an externally stabilized pump laser is increased through and above the lasing threshold, the device will commence laser operation in a single mode external cavity state and will, later, transition to the more stable multi-mode coherence collapse regime. The critical current at which the stable multi-mode operation occurs is determined by many interacting pump parameters.

As previously mentioned, optical amplifiers are pumped by a laser diode to derive signal gain. Generally, the drive current to the pump laser diode is controlled in a proportional manner such that an increase in signal power is obtained by an increase in drive current. However, at low power, pump power stability is compromised, as operation at currents near threshold causes large relative power fluctuations. Additionally, at high power, kinks and other non-linear characteristics of the L-I curve limit maximum operating power. Therefore, the overall dynamic range of amplifiers is typically limited to the linear portion of the L-I curve.

As the foregoing illustrates, there is a need in the art for an improved system and method for controlling optical amplifier output power.

SUMMARY OF THE INVENTION

The present invention generally relates to the operation of optical network equipment such as optical amplifiers. In one aspect, a method of operating an optical amplifier is provided such that output of the optical amplifier avoids the effects of operating an optical gain medium in a non-linear (kink) region of an L-I curve. The method generally includes operating an optical gain medium in a fully off state (Io=MIN) or fully on state (IoMAX) above the kink region with a PWM signal. The total optical power may be controlled by varying the duty cycle of the PWM signal.

In another aspect, the effects of the kink region may be compensated for by utilizing a lookup table. A sample of the optical power of an amplified optical signal may be used to select an entry in the lookup table that compensates for non-linearities in the kink region. In yet a further aspect, a lookup table may be used to control a pulse modulator to compensate for non-linearites in the kink region of the L-I curve.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides an improved system and method for optical amplifier control within optical communication systems. The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown, but is to be accorded the widest scope consistent with the principles and features described herein. In order to gain a detailed understanding of the invention, the reader is referred to the appended Figures in conjunction with the following description. It is to be understood that the drawings are diagrammatic and schematic representations only and are neither limiting of the scope of the present invention nor necessarily drawn to scale.

Figure 1:
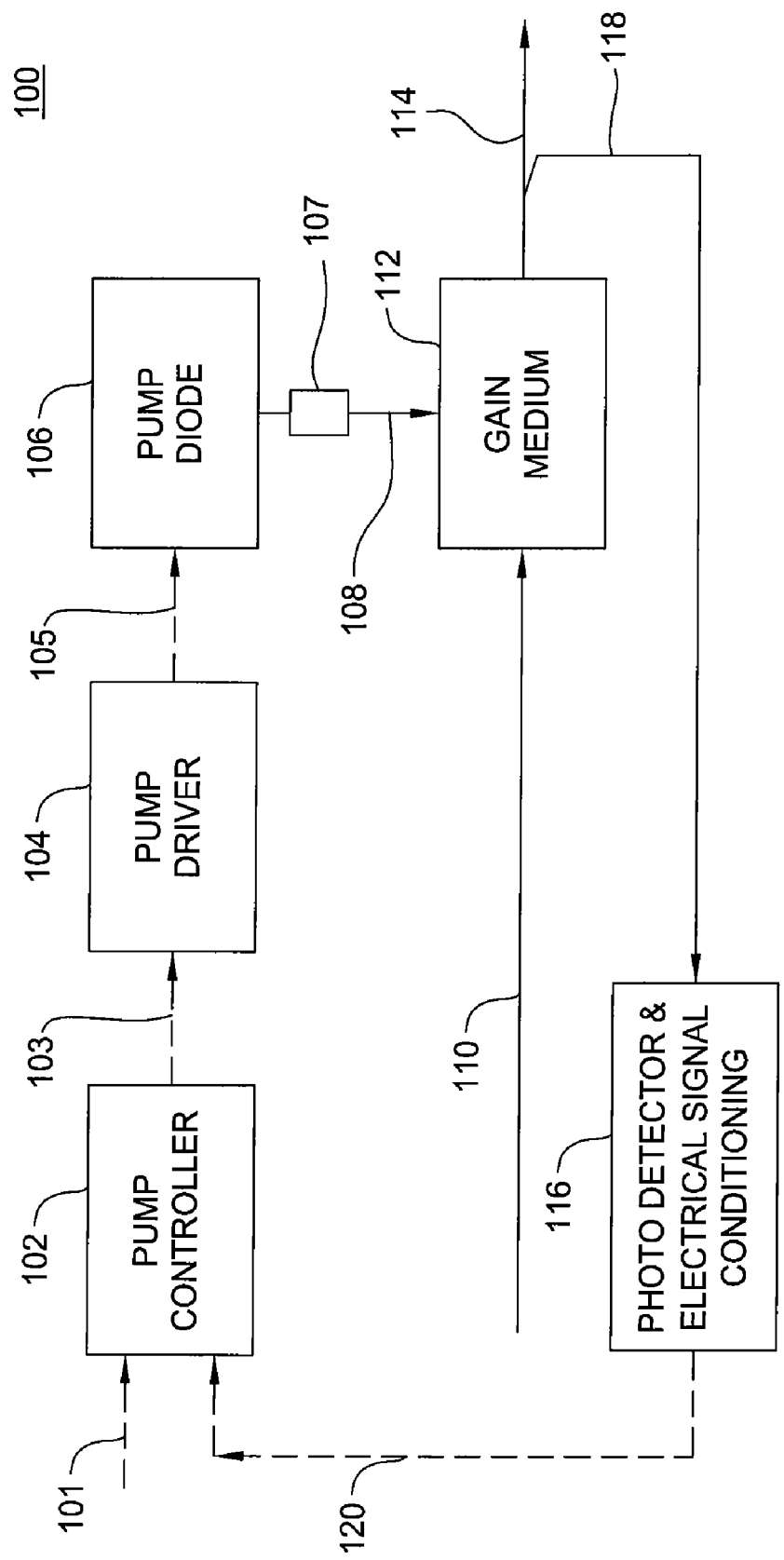
FIG. 1 illustrates a system for controlling an optical amplifier in accordance with the present invention.
Figure 2:
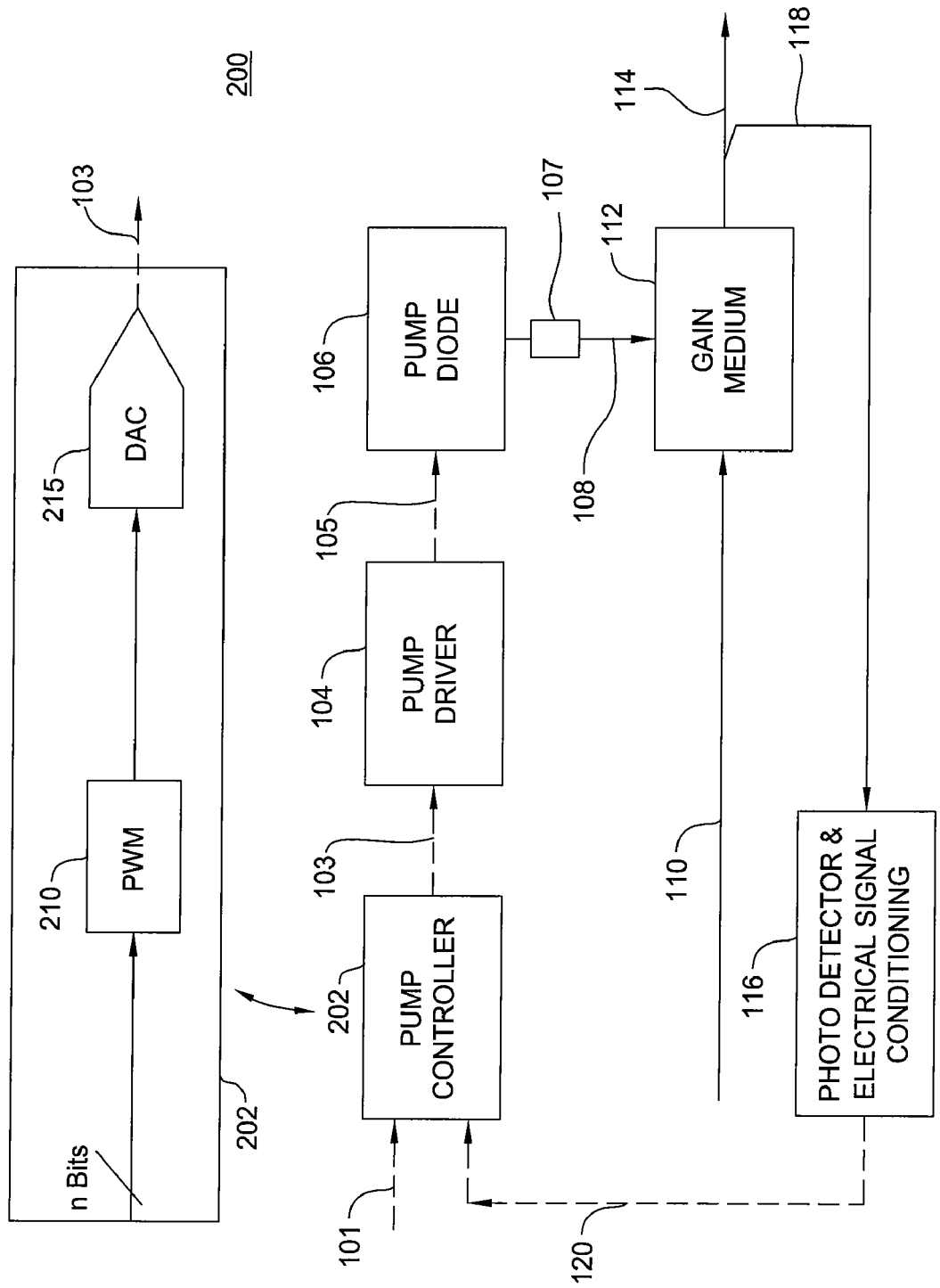
FIG. 2 illustrates the system with a pump controller configured to produce a pulse width modulated control signal.
Figure 3:
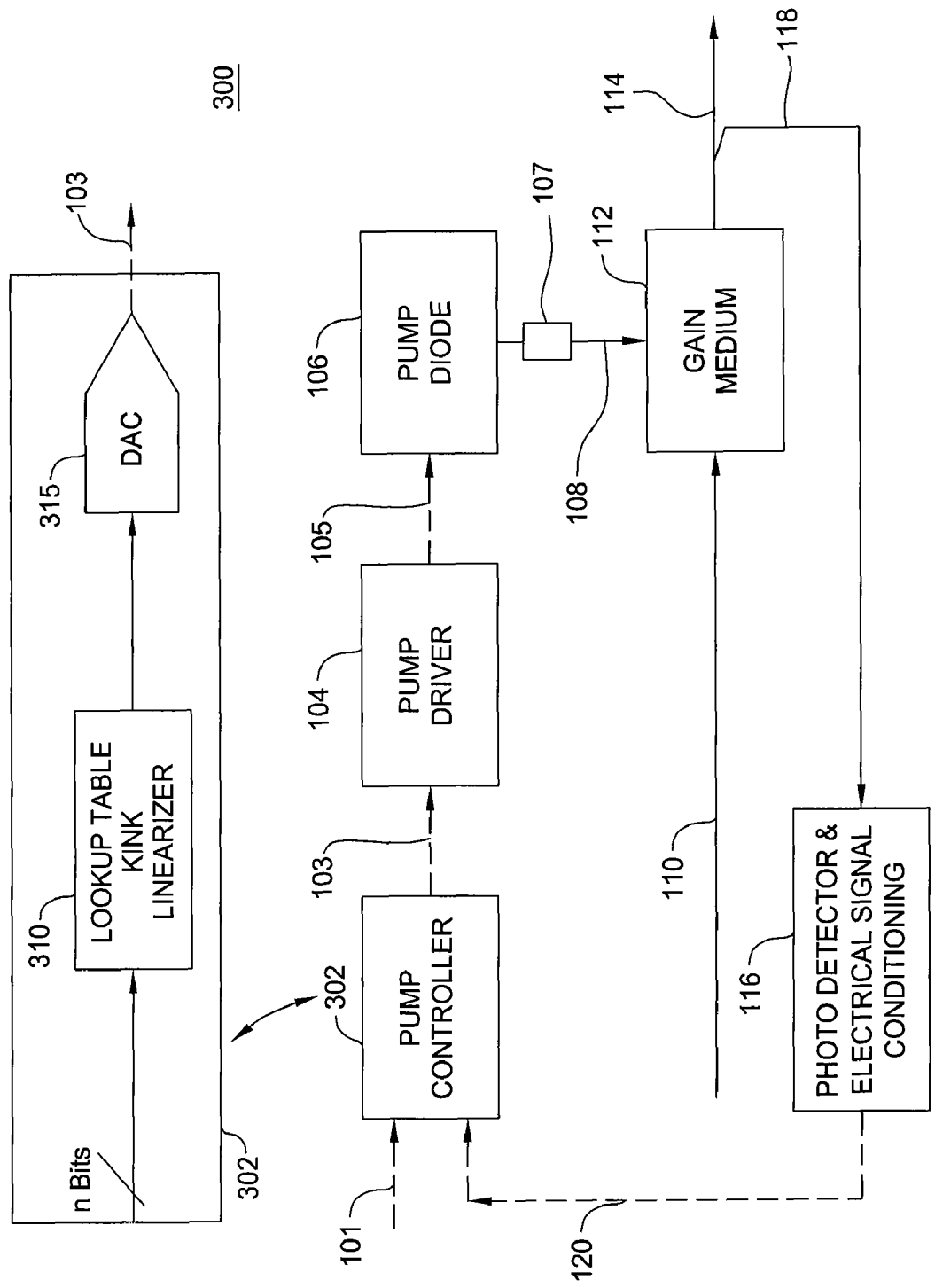
FIG. 3 illustrates the system with a pump controller configured to produce a control signal generated by utilizing a lookup table.
Figure 4:
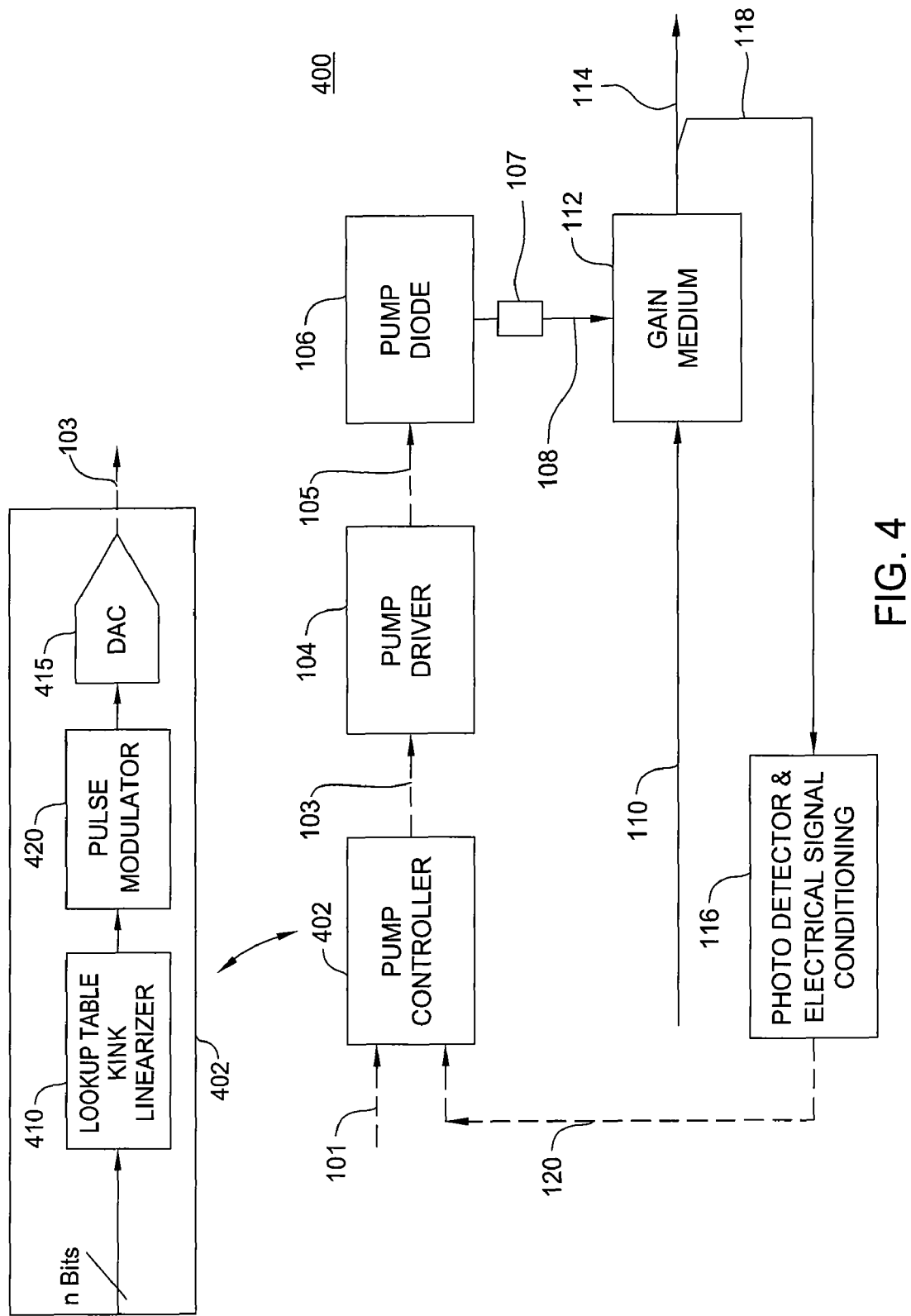
FIG. 4 illustrates the system with a pump controller configured to produce a control signal generated by utilizing a lookup table and pulse width modulation.

FIG. 1 generally illustrates a system 100 for controlling an optical amplifier in accordance with the present invention. FIGS. 2-4 illustrate the system 100 with different configurations of a pump controller. In FIG. 1, the dashed arrows represent pathways of electrical or electronic signals and the solid arrows represent pathways of light or of optical signals. Preferably, the optical pathways (solid arrows) are realized by or comprised of, in whole or in part, of optical fibers and any associated focusing, collimating, or other optics needed to inject light into and extract light out of the optical fibers. However, one of ordinary skill in the art will readily recognize that the various optical pathways may be constructed using optical components, such as free-space optics such as mirrors, prisms and lenses, or using planar waveguides, etc.

As shown in FIG. 1, the system 100 comprises an optical gain medium 112, preferably an Erbium doped fiber, for receiving an input optical signal 110 and outputting an amplified optical signal 114. The system 100 further comprises a pump laser diode 106 for providing a laser light 108 to an input of the gain medium 112. The system 100 may further comprise at least one fiber Bragg grating 107 optically coupled between the pump laser diode 106 and the optical gain medium 112. The system 100 also comprises a pump driver 104 for providing a drive current 105 to the pump laser diode. The system 100 further comprises a pump controller 102 for providing an electric control signal 103 to the pump driver 104. Additionally, the system 100 comprises a unit 116 having a photo-detector and electrical signal conditioning electronics optically coupled to an output of the optical gain medium 112 and electrically coupled to an input of the pump controller 102.

The unit 116 of the system 100 receives a sample portion 118 of the amplified output 114 of the gain medium and outputs an electrical signal 120 to the pump controller 102. The electrical signal 120 provides to the pump controller 102 information related to the optical power contained within the sample portion 118 and the amplified output signal 114. The pump controller compares the information provided in the electrical signal 120 to the desired amplifier set point information, this latter set point information provided in an electrical signal 101.

As illustrated in FIG. 1, the pump controller 102 of the system 100 provides the electric control signal 103 to the pump driver 104. The pump driver 104 then produces a drive current 105 that is sent to the pump laser diode 106. The form of the drive current 105 is related to the information provided in the control signal 103, which subsequently is used to produce the laser light 108 of the pump laser diode 106. The FBG 107 provides a wavelength selective feedback signal 109 (e.g., light reflected by the FBG 107) to the pump laser diode 106 such that the laser wavelength of the pump laser diode 106 remains constant as a function of drive current and/or as a function of laser diode temperature.

The stepwise control of the pump current within the system 100 occurs with a period that is typically longer than time constants (fractions of a microsecond) of current-dependent physical and/or electronic properties of the pump waveguide of the pump laser diode 106 that affect the lasing output. The variation of such properties, which may include temperature, temperature gradients, thermal diffusion, carrier density, refractive index, etc., as a result of the pump drive current causes modulation of the lasing Fabry Perot (FP) modes. This cavity mode modulation enhances the ability of the device to drop into a stable multi-mode coherence collapse regime at a coherent (power) level lower than would otherwise be possible. The minimum achievable power in this case is limited only by the ability of the electronic circuit and not the pump itself. This method also lends itself to simple digital drive solution. An exemplary system and method for dynamic range extension and stable low power operation of optical amplifiers using pump laser pulse modulation is disclosed in U.S. Pat. No. 7,110,167, which is herein incorporated by reference.

FIG. 2 illustrates a system 200 with a pump controller 202 configured to produce a pulse width modulated signal. For convenience, the components in the system 200 that are similar to the components in the system 100 are labeled with the same reference indicator. The pump controller 202 includes a pulse width modulator 210 and a digital-to-analog converter 215. The pump controller 202 provides a pulsed control signal 103 to the pump driver 104. The pump driver 104 then produces a pulsed drive current 105 that is sent to the pump diode 106. In general, the pump controller 202 will generate an n-bit control signal (based on the value of the feedback signal 120) to vary the duty cycle of a pulse width modulator (PWM) 210.

In order to avoid the adverse effects of the L-I kink region (i.e. nonlinear region of the L-I curve), the pump controller 202 is configured to operate the pump at a point (Iop-Max) which is above the kink region. In other words, when the PWM signal is on (e.g., a high current output state) the current signal 105 generated by the pump driver 104 is Iop-Max and when the PWM signal is off (e.g., a low current output state), the current signal is zero. The total optical output power level is controlled by varying the duty cycle (the percentage of a total period the PWM signal is high) of the PWM signal. In another embodiment, the high current output state results in current corresponding to optical power above a kink-limited output power of the pump system. In a further embodiment, the low current output state results in current corresponding to optical power below a threshold output power of the pump system.

Figure 2A:
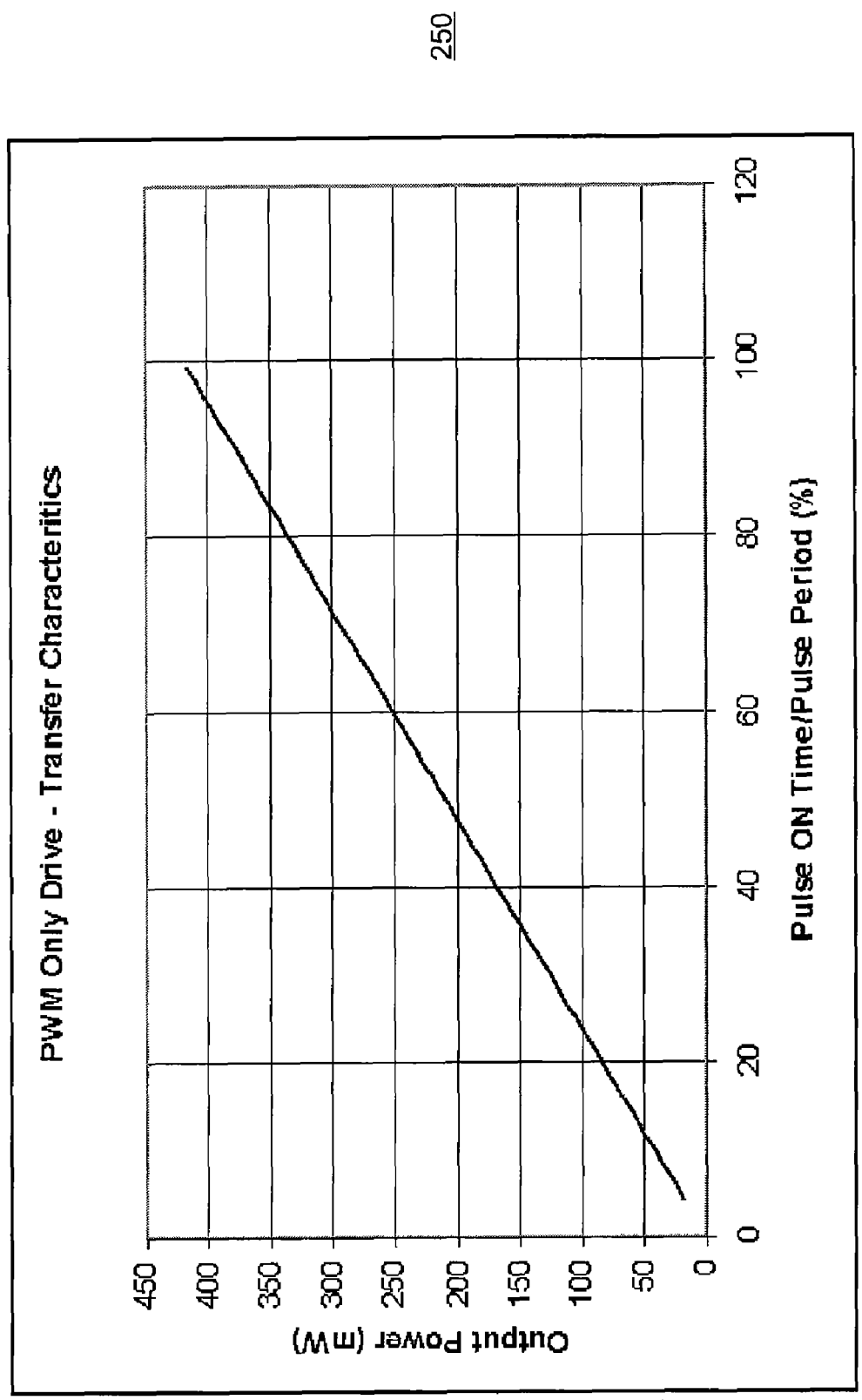
FIG. 2A is a graph illustrating the power transfer characteristics of the pump with respect to the duty cycle.

Conveniently, the characteristics of the optical gain medium 112 (i.e. Erbium doped fiber) may naturally act to average the power output. For instance, if the pulse is turned on (Iop-Max) half of each cycle and turned off half of each cycle (a duty cycle of 50%), then the out power level may be averaged to 50% of Iop-Max by the optical gain medium 112. Further, the optical gain medium 112 (i.e. Erbium doped fiber) acts as a low pass filter. At low frequencies, pump pulsing will lead to unwanted fluctuations in the signal output. Choosing the minimum pulse repetition frequency above the highest Erbium corner frequency, unwanted output power fluctuations are suppressed. FIG. 2A illustrates the power transfer characteristics of the pump with respect to the duty cycle. In this manner, the linearity of the power transfer characteristics may be controlled by the pulse fidelity of the electronics and the effects of the non-linearity of the L-I curve may be eliminated.

Referring back to FIG. 2, the form of the pulsed drive current 105 is related to the information provided in the pulsed control signal 103. The pulsed drive current 105 alternately attains a low level when the pump current is zero and a high level when the pump current is at Iop-Max (i.e. the current corresponding to a maximum output power obtainable from the pump). These alternating low and high drive current levels produce alternating low and high pulsed laser light 108 of the pump laser diode 106. The one (or more)

FBG(s) 107 provide wavelength selective feedback to the pump laser diode 106 such that the lasing wavelength of the pump laser diode 106 remains constant as a function of drive current and/or as a function of laser diode temperature. Because of the periodicity of the drive current 105, the drive current assumes a time-averaged level, which is of an appropriate magnitude to cause the power of the amplified output signal 114 to match the desired set point. The time-averaged level is determined by either the heights (amplitudes) or widths (or both) of the pulses of the drive current 105. If the high level is maintained constant and only the pulse widths (i.e., durations) are changed in response to changing set points, then the drive current is termed a "Pulse Width Modulated Drive Current".

FIG. 3 illustrates a system 300 with a pump controller 302 configured to produce a control signal generated by utilizing a lookup table 310. Generally, a lookup table refers to any suitable type of data structure, such as an array, used to replace a predefined computation with a simpler lookup operation. In the system 300, entries in the lookup table 310 may be designed to implement a linearization function generated by fitting a correction value to the pump L-I curve to compensate for the kink region. In other words, for load values in the kink region, the lookup table 310 may produce compensated current values resulting in a linearized optical power output. The value from the lookup table may be used to control a digital-to-analog converter 315, the output from which subsequently becomes the control signal 103. In one embodiment, the lookup table and the L-I curve are stored in the pump controller 302. In another embodiment, a lookup table is a mapping between a pump laser control parameter (such as drive current) and a desirable output (such as output power of the pump, gain of the EDFA, output power of the EDFA, or some equality metric associated with a system such as Bit Error Rate, or Power Penalty, etc), where the lookup table is "stored" within the control system as a means to optimizing the desirable output.

Figure 3A:
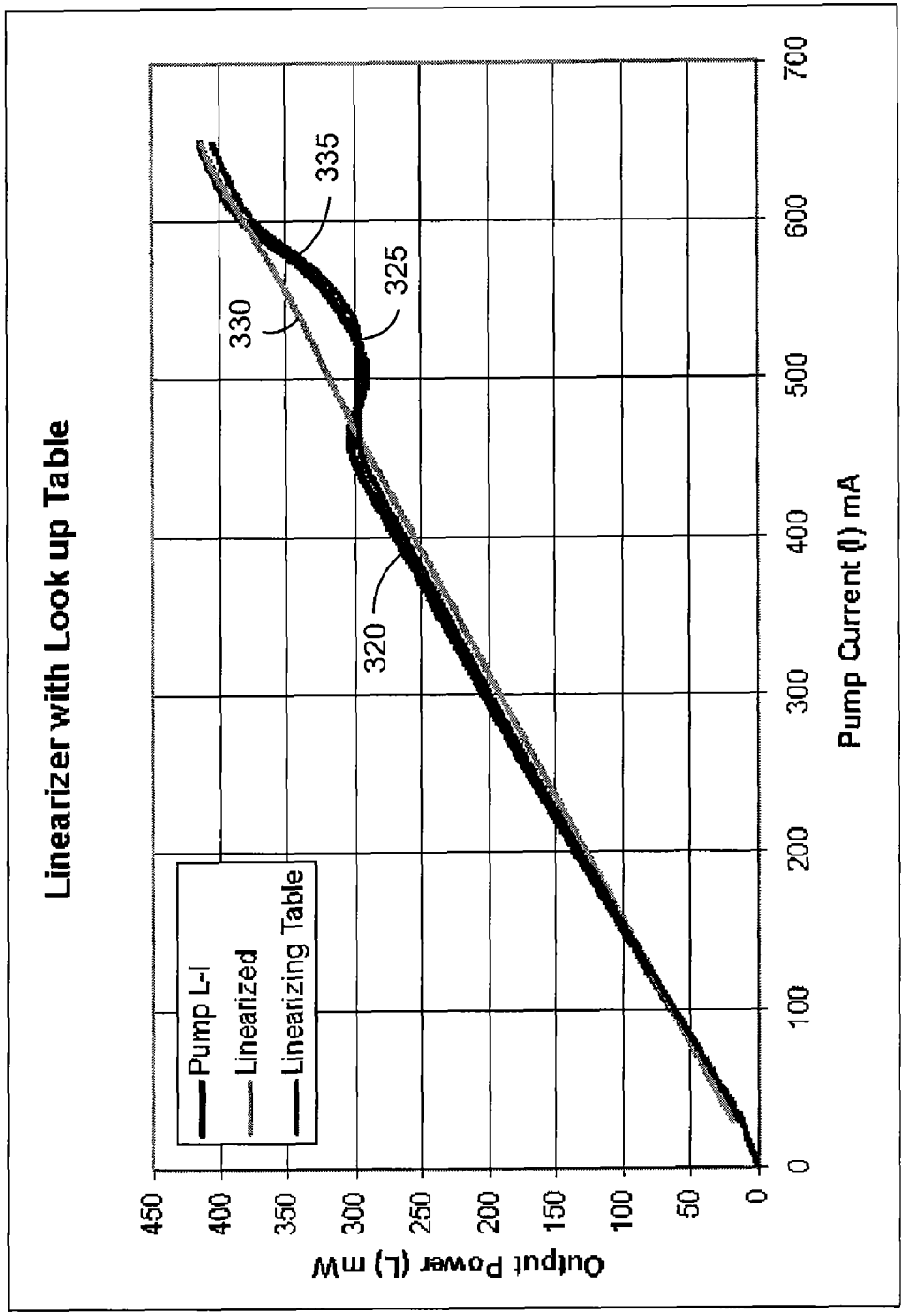
FIG. 3A is a graph illustrating a linearized output.

FIG. 3A illustrates a graph of a linearized output power achieved using values from the lookup table 310. As shown in FIG. 3A, there are three lines on the graph. The first line is a conventional pump L-I curve 320 with a kink region 325. The second line is a linearized output line 330 that was formed utilizing the lookup table. The third line is a linearizing table content line 335. The values used to populate the lookup table are generally determined by synthesizing a straight line (e.g. linearized output line 330) having an arbitrary slope and then comparing the straight line to the pump L-I curve 320 to generate a correction table (e.g. linearizing table content line 335). In this manner, the correction table is used to modify the kink region 325 of the L-I curve 320 such that the output is linearized at the kink region 325 as illustrated by the linearized output line 330.

FIG. 4 illustrates a system 400 with a pump controller 402 configured to produce a control signal utilizing a lookup table 410 and a pulse width modulator 420. As previously described with reference to FIG. 2, because of the natural filtering properties of the optical gain medium 112 (i.e. Erbium doped fiber), the optical gain medium 112 used in conjunction with the pulse width modulator 420 may serve to reduce or softens the L-I curve proximate the kink region. The lookup table may then be used to linearize the softened curve in a similar manner as described in FIG. 3. In this manner, the depth of the kink region is reduced by the pulse width modulator 420, and then the lookup table 410 produces a linearized power output value from the pump for a given drive current.

Because the time interval between successive pulses emitted by the pump laser diode 106 is much less than the lifetime of the excited state of pumped ions within the gain medium, the gain medium continues to provide amplification gain to the optical signal 110 even during those intervals during which the pump diode 106 is emitting low power output. For instance, for an Erbium-bearing gain medium, such as Er-doped fiber, the lowest frequency of pulses that may be used will be limited by the rejection needed from the Erbium low pass characteristics. Appropriate frequency of modulation must be chosen in order to reduce the impact on signal transmission. For example in a 980 nm pump, a frequency of 3 MHz will provide about 30 dB rejection due to Erbium characteristics. Depending upon the power level and pump wavelength, other suitable frequencies can be devised to achieve required performance.

Figure 4A:
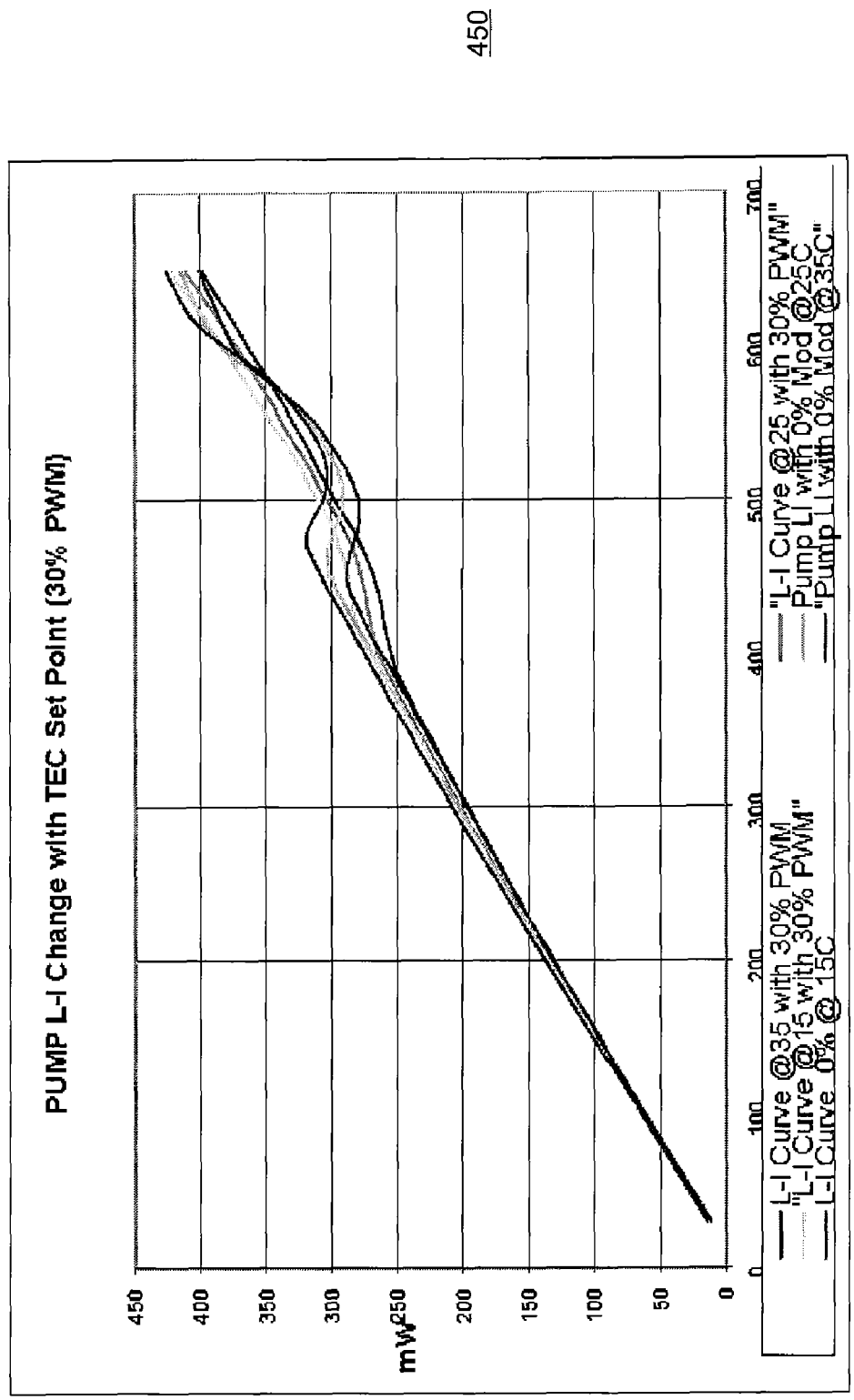
FIG. 4A is a graph illustrating the softening of the non-linearity of the pump by pulse width modulation.
Figure 4B:
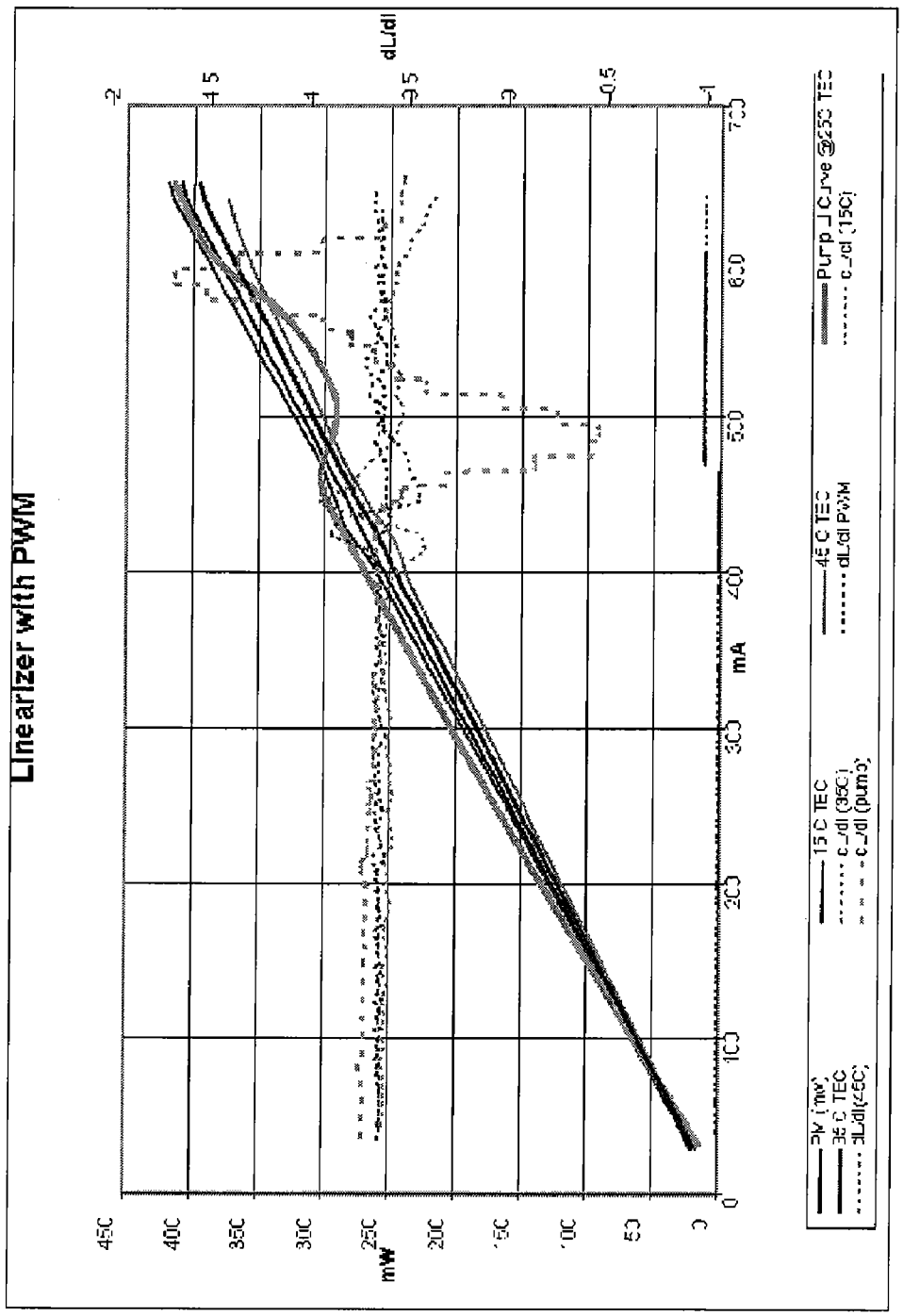
FIG. 4B is a graph illustrating a linearized output with the lookup table and pulse width modulation.

As set forth herein, the depth of the kink region is reduced by the pulse width modulator 420 in the pump controller 402. The application of modulation acts to soften the non-linearity of the pump. FIG. 4A is a graph 450 illustrating the softening of the non-linearity of the pump by the pulse width modulator 420. The graph 450 shows the movement of the L-I curve with temperature and the equivalent movement with 30% PWM modulation depth. As clearly shown in FIG. 4A, the application PWM reduces the depth of kink and softens the transition contour. Thus the linearization with PWM requires less correction and sensitivity to environmental and ageing changes to pump non-linearity. FIG. 4B is a graph 475 illustrating a linearized output with PWM and the lookup table. As clearly shown, the use PWM with linearization reduces the impact of kink movement in the pump.

Improved systems and methods for controlled optical amplifier operation have been disclosed. Compared to conventional systems and methods for controlling an optical amplifier, the systems and methods in accordance with the present invention provides the advantages of: 1. Extending the dynamic range of pumps from their maximum operating power to near zero, this attribute being limited only by the circuit and not by the pump itself; 2. Not requiring any changes to the pump and providing an environment within which pump costs (materials, yield, etc.) and pump physical dimensions (pigtail length, number of Fiber Bragg Gratings) might be advantageously reduced; 3. Providing the groundwork for a simple, low cost digital control system. 4. Reducing the net heat generated by the combined electronics and pump ensemble as compared to linear drive controls (an advantage especially for uncooled pumps); 5. Permitting pump operation up to its maximum rated power (whereas dither modulation is, by definition, limited to the power corresponding to the maximum mean current); and 6. Enabling stable power operation of uncooled pumps across a wide temperature range (whereas Fiber Bragg Grating stabilization has difficulty maintaining power stabilization while maintaining wavelength stabilization across the resulting very wide detuning range).

While the foregoing is directed to embodiments of the present invention, other and further embodiments of the invention may be devised without departing from the basic scope thereof, and the scope thereof is determined by the claims that follow.

The invention claimed is:

1. A method of operating an optical amplifier, comprising:
obtaining, from a lookup table, a control value for use in generating a signal for controlling a pump laser system, wherein the control value is retrieved from the lookup table and entries in the lookup table are designed to compensate for non-linearities in a power-current curve of an optical gain medium and wherein the signal comprises a pulsed current signal that is a pulse width modulated current signal and an amplified optical signal is controlled by the widths of the pulses.

2. The method of claim 1, further including receiving a feedback signal indicative of optical power of an amplified optical signal.

3. The method of claim 2, wherein the control value is retrieved from the lookup table as a function of the feedback signal.

4. The method of claim 1, wherein the lookup table is a mapping between a pump laser control parameter and a desirable output.

5. The method of claim 4, wherein the lookup table is stored within a control system of the pump laser system in order to optimize the desirable output.

6. An optical amplifier system comprising:
   an optical gain medium configured to receive an input optical signal and output an amplified optical signal;
   a pump laser optically coupled to an input of the optical gain medium;
   a lookup table containing entries corresponding to different values of a feedback signal indicative of optical power of the amplified optical signal, wherein the entries are designed to compensate for non-linearities in a power-current curve of the optical gain medium; and
   a pump controller configured to retrieve an entry from the lookup table based on the feedback signal and generate a control signal based on a value of the retrieved entry to control the pump laser in a manner that compensates for non-linearities in the power-current curve of the optical gain medium, wherein the control signal comprises a pulsed current signal that is a pulse width modulated current signal and the amplified optical signal is controlled by the widths of the pulses.

7. The optical amplifier of claim 6, wherein the optical gain medium is an Erbium-doped fiber.

8. The optical amplifier of claim 6, further comprising a feedback member optically coupled between the optical gain medium and the pump laser.

9. The method of claim 1, wherein the non-linearities is a kink region on the power-current curve and the entries in the lookup table are designed to implement a linearization function generated by fitting a correction value to the power-current curve to compensate for the kink region.

10. The method of claim 1, wherein entries in the lookup table produces compensated current values for load values in a region of the non-linearities on the power-current curve which results in a linearized optical power output.

11. The optical amplifier of claim 6, wherein the non-linearities is a kink region on the power-current curve and the entries in the lookup table are designed to implement a linearization function generated by fitting a correction value to the power-current curve to compensate for the kink region.

12. The optical amplifier of claim 6, wherein the non-linearities is a kink region on the power-current curve and the entries in the lookup table are designed to modify the kink region of the power-current curve such that the output is linearized at the kink region.

13. The optical amplifier of claim 8, wherein the feedback member is a fiber Bragg grating.

* * * * *